June 3, 1958  S. C. SHALLON  2,837,644
TIME DISCRIMINATOR
Filed July 15, 1955

INV.
SHELDON C. SHALLON
By Henry Heyman
ATT'Y.

United States Patent Office 2,837,644
Patented June 3, 1958

2,837,644
TIME DISCRIMINATOR

Sheldon C. Shallon, Los Angeles, Calif., assignor to Hughes Aircraft Company, Culver City, Calif., a corporation of Delaware Application July 15, 1955, Serial No. 522,212

8 Claims. (Cl. 250—27)

The present invention relates to time discriminator circuits and more particularly to a time discriminator circuit for determining the difference in times of occurrence of two or more signals.

In co-pending U. S. patent application, Serial Number 356,402, entitled "Time Discriminator," by Jerome E. Jacobs and Ercell E. St. John, filed May 21, 1953, now Patent 2,814,725, there is described a new form of time discriminator circuit which is operative to provide an output signal representative of the relative time of occurrence of an incoming signal pulse with respect to two gating pulses. The respective gating signals are employed to effect sequential operation of a pair of tubes during coincidence between the input signal pulses and the gating signals, whereupon output signals are developed which are a measure of the difference in the conductive periods of the tubes.

While the circuit of the aforementioned application represents a considerable improvement over those heretofore known in the prior art, the circuit suffers from a number of defects which detract considerably from its ease and accuracy of operation. More particularly, the time discriminator therein described utilizes transformers to isolate the input circuit for the incoming signal pulses and the input circuits for the gating signals from their respective signal sources. Such transformers are characterized by an interwinding capacitance through which the gating signals may be coupled to the output circuit of the time discriminator, even in the absence of an incoming signal pulse, and accordingly causes the circuit to produce an erroneous indication of an input signal pulse. The Jacobs and St. John time discriminator attempts to overcome this signal feed-through by providing a coupling capacitor for introducing a signal 180° out of phase with the leaking signal at an appropriate point in the discriminator circuit, thereby achieving cancellation of the leakage signal. In view of the variable nature of interwinding capacitance of transformers, this capacitor is made adjustable, whereby the amplitude of the cancelling signal may be varied to achieve complete cancellation. Unfortunately, in practice complete cancellation of the leaking signals cannot be achieved and accordingly error free operation of the aforementioned circuit is difficult if not impossible.

It is, therefore, an object of the present invention to provide an improved time discriminator circuit employing grid-controlled electron tubes for receiving gating pulses and an input signal pulse and for producing an output signal representative of the degree of coincidence between the input signal and the gating pulses.

A further object of the present invention is to provide an improved time discriminator of the class described in which gating signals do not appear on the output circuit in the absence of a coincident input signal pulse.

Yet another object of the present invention is to provide a time discriminator of the class described which is arranged to receive a pair of gating pulses through a pair of gating transformers and an input signal on an input transformer and in which no portion of the respective pulses is coupled into the circuit due to the interwinding capacitances of the transformers.

Still another object of the present invention is to provide a pulse coincidence measuring circuit of improved accuracy which is simple and requires a minimum of adjustment to achieve optimum operation.

A further object of the present invention is to provide an improved time discriminator circuit which may be easily balanced to provide a substantially linear output signal which is a direct function of the time of occurrence of an applied input signal.

A time discriminator according to the present invention includes a pair of triode electron discharge devices connected in a series circuit including a pair of input signal sources for impressing input signals of corresponding polarity on the plates of each tube and means for applying gating pulses to the grid-cathode circuits of each of the tubes whereby each of the tubes is rendered conductive during time coincidence between the input signal pulses and the respective gating signals. Output signals may be taken from the cathodes of either of the tubes, which are maintained at substantially constant A. C. potential by means of a pair of capacitors connected between each of the cathodes and ground, respectively.

The novel features which are believed to be characteristic of the invention, both as to its organization and method of operation, together with further objects and advantages thereof, will be better understood from the following description considered in connection with the accompanying drawing in which an embodiment of the invention is illustrated by way of example. It is to be expressly understood, however, that the drawing is for the purpose of illustration and description only, and is not intended as a definition of the limits of the invention.

Figure 1:
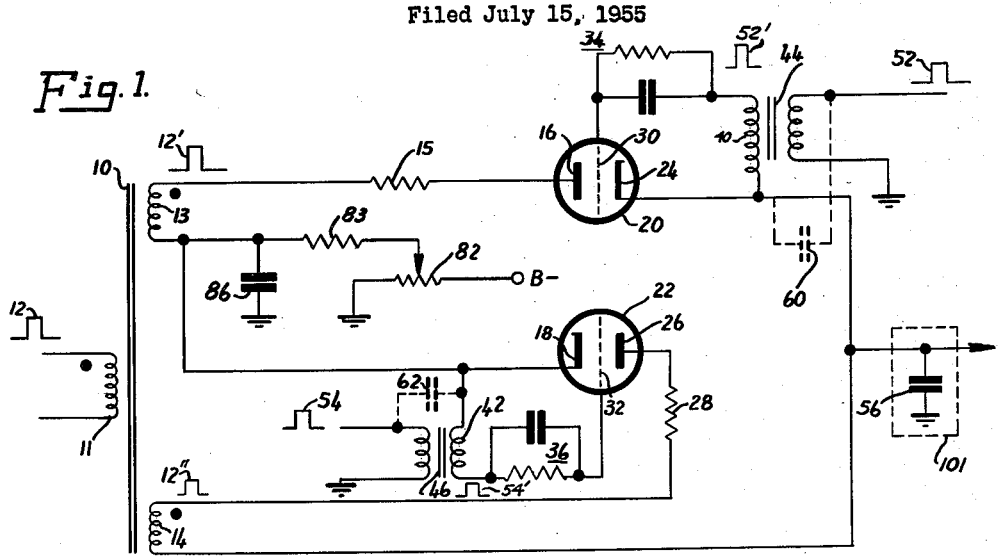
Fig. 1 is a circuit diagram of an embodiment of the time discriminator circuit according to the present invention.

As shown in Fig. 1, the time discriminator comprises an input transformer 10 having a primary winding 11 arranged to receive input signals 12 from a source of input signals (not shown) and a pair of secondary windings 13 and 14 upon which pulses 12' and 12" appear in response to the application of pulse 12 to primary winding 11. The corresponding polarity ends of each of secondary windings 13 and 14 are connected to the plates 16 and 26 of a pair of electron discharge devices such as triodes 20 and 22, respectively, through balancing resistors 15 and 28. The cathode 24 of triode 20 is connected to the remaining end of winding 14 and to an output load 101, while the cathode 18 of triode 22 is connected to the remaining end of winding 13 and a capacitor 86.

The grid-cathode circuits of the respective tubes comprising grid 30, cathode 24 and grid 32, cathode 18, are biased by means of conventional resistor-capacitor biasing networks 34, 36, so as to make tubes 20 and 22 normally non-conducting. The grid-cathode circuits are connected to receive gating pulses from the secondary windings 40 and 42 of a pair of gating transformers 44 and 46 to which gating pulses 52 and 54, having the polarity shown, are applied from respective sources of gating pulses (not shown). Each of transformers 44 and 46 is so connected that the pulse applied to grids 30 and 32, depicted as pulses 52' and 54', would normally render the tube conductive during coincidence between the signal pulses 12 and the gating pulses.

An output utilization or load circuit 101 is connected between cathode 24 and a point of reference potential, such as ground. The load 101 may represent the input circuit of an electronic integrator, in which case it is effectively a large capacitor, depicted as capacitor 56, which offers substantially negligible impedance to varying currents appearing at the cathode 24, i. e., cathode 24 is maintained at substantially fixed A. C. potential with respect to ground. Capacitor 86 similarly maintains cathode 18 at a fixed A. C. potential with respect to ground.

Completed direct-current paths for the individual tubes are provided by resistive coupling across capacitor 86 and ground, the coupling comprising a fixed resistor 83 and a potentiometer resistor 82 having one end of its fixed winding grounded. The other end of the fixed winding is connected to a source of reference potential —B, not shown. Potentiometer 82 may be varied to set the average operating potential of output signals to a desired value.

In addition to the circuit elements thus described the interwinding capacitance of transformers 44 and 46 have been depicted as a pair of capacitors 60 and 62 shown dotted in the circuit of Fig. 1. As will be more fully explained hereinafter, the circuit configuration of Fig. 1 is such that the gating signals fed through by each of its interwinding capacitors is effectively grounded, and therefore do not interfere with the proper operation of the circuit.

Signal pulses 12 applied to primary winding 11 will be seen to appear across each of secondary windings 13 and 14 as positive pulses 12 and 12'. In the absence of gating pulses 52' and 54', triodes 20 and 22 are normally biased in a nonconductive state and accordingly neither of the tubes will conduct and no output signal will appear on output load 101. However, current will flow through each of the tubes during coincidence between signal pulses 12' and 12" and the respective gating pulses 52' and 54'. By tracing the direct current paths for the individual tubes, it will be seen that curent flow through tubes 20 and 22 will be in opposite directions with respect to output load 101. Accordingly, there will be a resulting net change in charge at load 101 when there is a difference in the periods of coincidence between the signal pulses 12 and the respective gating pulses 52 and 54, the difference in charge being indicative of the difference in the periods of coincidence.

Similarly, the application of either of gating signals 52' and 54' to triodes 20 and 22 in the absence of an input signal pulse 12, while rendering each of the tubes conductive, will not produce a conduction current in the tubes since no plate potential is present at the plate of either tube.

The leakage currents which would flow through interwinding capacitors 60 and 62 will, in the circuit of Fig. 1, be shunted to ground by capacitors 86 and 56. If these capacitors are of sufficient size, substantially no change in potential at either point will take place, since the interwinding capacitance will ordinarily be of sufficiently small size with respect to capacitors 86 and 56 so that most of the voltage drop due to the stray pulse takes place across the leakage capacitance. Accordingly, the gating signal will not appear at windings 13, 14 nor at output circuit 101 and stray signals will not interfere with the normal operation of the circuit.

Figure 2:
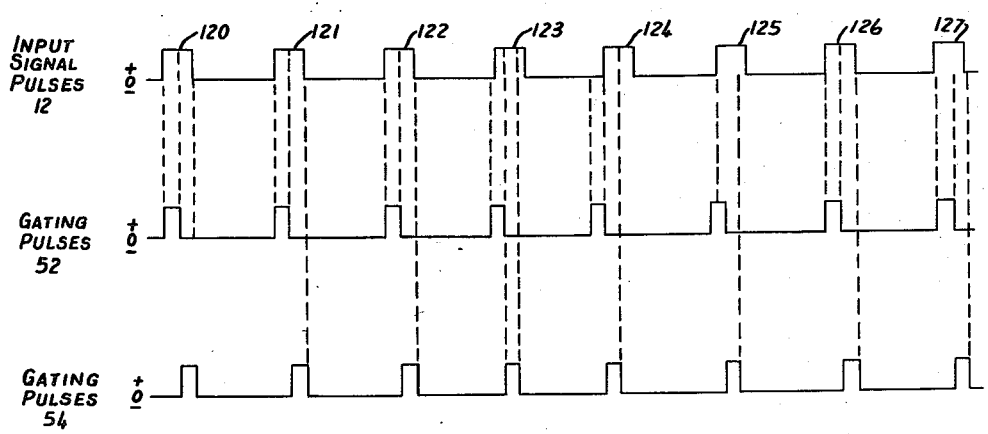
Fig. 2 is a diagram of waveforms appearing in the circuit of Fig. 1 in a representative mode of operation.
Figure 2:
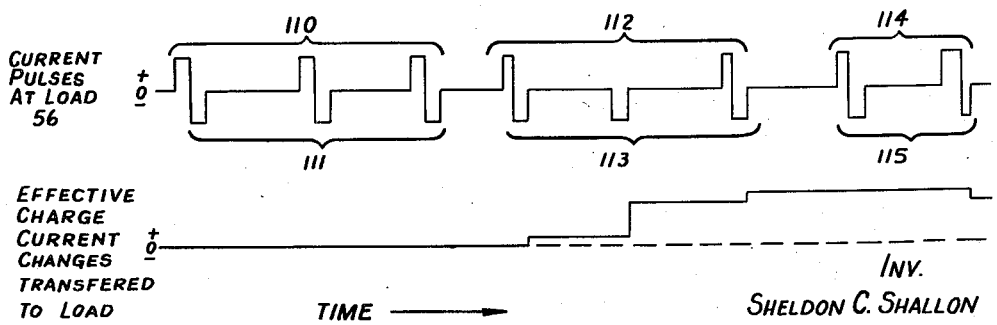

Considering now the operation of the circuit thus described, reference is now made to Fig. 2 wherein there are depicted waveforms of signals appearing in the circuit of Fig. 1 when operating in a representative manner. Time is depicted as the abscissa of the waveforms, while the ordinate of each waveform represents its amplitude, a separate axis of ordinates being utilized for each waveform.

As shown in Fig. 2, successive signal pulses 12 applied to the time discriminator of Fig. 1 may be separated by equal time intervals as indicated by equally spaced pulses 120, 121 and 122, by successive increasing time intervals as indicated by successively widely spaced pulses 123 and 124, or by successively decreasing time intervals, as indicated by successively more closely spaced signal pulses 125, 126 and 127. It will be assumed for purposes of illustration that gating pulses 52 are "early" gating pulses and that gating pulses 54 are "late" gating pulses, that is, occurring later in time than pulses 52. It will be further assumed for purposes of illustration that each of the gating pulses has a width corresponding to one-half of the width of the input signal pulses and that the leading edge of the "late" gating pulses occurs simultaneously with the trailing edge of the "early" gating pulses.

For the equally spaced signal pulses 120—122 the early and late gating pulses applied to the control grids 30, 32 of tubes 20, 22 (Fig. 1) are shown with their respective trailing and leading edges coinciding with the centers of the equally spaced pulses 120—122. Upon the grid bias of tube 20 being overcome by the early gate pulses, current flows from winding 13 through tube 20, producing positive current pulses 110 at load 101. When the late gate pulses 54 are applied tube 22 is rendered conductive and current pulses flow through tube 22 toward load 101; these have been designated as negative current pulses 111. As indicated in Fig. 2, for equal intervals of current flow through the respective tubes 20, 22, in the manner above described, positive current pulses 110 and the associated negative current pulses 111 are of equal duration and magnitude and accordingly the net change of charge at load 101 is zero, the average potential at the load therefore remaining unchanged, as shown in waveform 116.

Signal pulse 123 follows signal pulse 122 by a greater period of time than the equal periods between signal pulses 120, 121, and 121, 122, and thus the trailing and leading edges of the associated early and late gates pulses occur in advance of the center of signal pulse 123; accordingly, there is a decrease in the period of coincidence between the signal pulse 123 and the associated early gate pulse, while the period of coincidence between the signal pulse 123 and the associated late gate pulse remains the same as before. Accordingly, tube 20, to which the early gate pulse is applied, conducts for a shorter period of time than the sequentially operated tube 20; this results in a positive current pulse 112 and a following negative current pulse 113 at the load 101 whose relative durations reflect the differences in times of coincidence of the respective gating pulses with the signal pulse 123. Since the negative current pulse 113 is the longer in duration, a net negative current pulse obtains which effects an increase in the charge or operating potential at the load 101 (Fig. 1), as indicated in waveform 116.

The resulting increase in average operating potential at the load 101 may be utilized as an indication that the rate of occurrence of the input signal pulses with respect to the gate pulses has changed, thereby accomplishing time demodulation of the input signal. If desired, additional means may be utilized to change the rate at which the gating pulses occur to re-establish the coincidence condition which obtained for pulses 120 and 121.

Following signal pulse 125, succeeding signal pulses 126 and 127 illustrate successively decreasing time intervals between incoming signal pulses applied to input transformer 12. The positions of the trailing and leading edges of the early and late gate pulses associated with the earlier arriving signal pulses 126, 127 are seen to be the reverse of the conditions shown and described in connection with the later arriving signal pulses 123 and 124 and accordingly, a decrease in net charge applied to the load 101 occurs, as depicted in waveform 116.

It will readily be recognized that the time discriminator thus described is arranged to provide a continuous conductive path through secondary winding 13, triode 22, secondary winding 14, and triode 20, when gate pulses are presented at the grids of triodes 20 and 22. In addition, means comprising capacitors 86 and 56 are provided to maintain the cathodes of each of triodes 20 and 22 at substantially ground potential with respect to alternating current signals. Resistors 15 and 28 are included to limit the conduction currents in this series circuit and may be varied to provide a balance whereby a corresponding amplitude of output signal is developed at capacitor 101 when the conduction period of each of tubes 20 and 22 are equal.

The circuit thus described offers the particular advantage over those known in the prior art in that a time discriminator circuit is achieved in which one side of the grid cathode input circuit of each tube operates at substantially ground potential. If there is no time coincidence between the gating pulses applied to the two tubes each tube forms a series circuit including its respective secondary winding, capacitor 86 and capacitor 101. It should be understood that while the present invention has been described with particular reference to the times of occurrence of the input signal pulses and the gating pulses, the invention disclosed herein is considered to reside in the circuit described and need not be limited to the particular time sequence of signals shown, which are set forth for illustrative purposes only. It will readily be understood that occasions may arise where it will be desirable to provide that the gating pulses applied to the two transformers coincide for a particular interval of time or alternatively, that they be displaced with respect to each other for a particular interval of time. Similarly, it will readily be understood that the gating pulses need not be discreetly related in width to the input signal pulse as described but may have widths corresponding to any desired value.

What is claimed as new is:

1. A time discriminator circuit comprising: an input signal transformer having first and second secondary windings; first and second electronic vacuum tubes, each having a cathode, grid and plate; means interconnecting the plate of said first tube and one end of said first secondary windings; means interconnecting the plate of said second tube and the end of said second secondary winding having a polarity corresponding to that of said one end of said first secondary winding; means interconnecting the cathode of said first tube and the remaining end of said second secondary winding; means interconnecting the cathode of said second tube and the remaining end of said first secondary winding; means for applying gating pulses to the grid of each of said tubes whereby said tubes are rendered conductive during the period of coincidence between said input signal pulses and said gating pulses, respectively, and means for maintaining the cathodes of each of said tubes at substantially constant alternating current potential.

2. The time discriminator circuit defined in claim 1, wherein said last named means comprises a pair of capacitors connected individually between the cathodes of each of said tubes and ground, said capacitors offering substantially negligible impedance at the frequency of said input and gating signals.

3. A time discriminator circuit comprising a series circuit including a first transformer winding, a first electron discharge device, a second transformer winding and a second electron discharge device, each of said electron discharge devices having a cathode, grid and plate, said devices being connected to conduct in the same direction in said series circuit, and said windings being connected with a series aiding polarity; means for biasing each of said devices; and means for rendering each of said devices conductive in response to applied gating signals when a signal is impressed across said first and second transformer windings.

4. The time discriminator circuit described in claim 3, including in addition, a first capacitor interconnecting the cathode of said first electron discharge device and ground, and a second capacitor interconnecting the cathode of said second electron discharge device and ground.

5. A time discriminator circuit comprising: first and second electron discharge devices each having a plate, grid, and cathode; a first conductive path including a first impedance element interconnecting the plate of said first electron discharge device and the cathode of said second electron discharge device; a second conductive path including a second impedance element interconnecting the cathode of said first electron discharge device and the plate of said second electron discharge device; means for impressing input signal pulses across each of said first and second elements; first and second gating means for impressing gating signals on the grids of each of said first and second electron discharge devices, respectively, and means for maintaining the cathodes of each of said first and second electron discharge devices at substantially constant alternating current potential.

6. The time discriminator defined in claim 5, wherein said impedance elements comprise an input transformer having a primary winding and first and second secondary windings, said first and second secondary windings each forming a portion of said first and second conductive paths, respectively.

7. A time discriminator circuit comprising, a first series circuit including a first electron discharge device, a first transformer winding and a load, a second series circuit including a second electron discharge device, a second transformer winding and said load, said electron discharge devices being connected to conduct in opposite directions through said load, means for normally biasing each of said devices to prevent conduction, and means for independently rendering each of said devices conductive in response to applied gating signals when a signal is impressed across said first and second transformer windings.

8. Apparatus for providing an indication of the relative time of occurrence of an input signal with respect to two gating signals comprising, a first series circuit including a first transformer winding, a first electron discharge device and a capacitor, a second series circuit including a second transformer winding, a second electron discharge device and said capacitor, said electron discharge devices being connected to conduct in opposite directions to charge said capacitor with opposite polarities, means for normally biasing each of said devices to cutoff, and means for independently rendering each of said devices conductive in response to applied gating signals when an input signal is impressed across said first and second transformer windings, whereby a voltage is developed across said capacitor which is representative of the relative time of occurrence of the input signal with respect to the gating signals.

References Cited in the file of this patent

UNITED STATES PATENTS

| | | |
|---|---|---|
| 2,335,265 | Dodington | Nov. 30, 1943 |
| 2,480,385 | Sebring | Aug. 30, 1949 |
| 2,563,816 | Butman | Aug. 14, 1951 |
| 2,583,832 | Goldberg | Jan. 29, 1952 |
| 2,605,410 | Friend | July 29, 1952 |